June 5, 1956 F. O. LUENBERGER 2,749,456
WATERPROOF STATOR CONSTRUCTION FOR SUBMERSIBLE DYNAMO-ELECTRIC MACHINE
Filed June 23, 1952
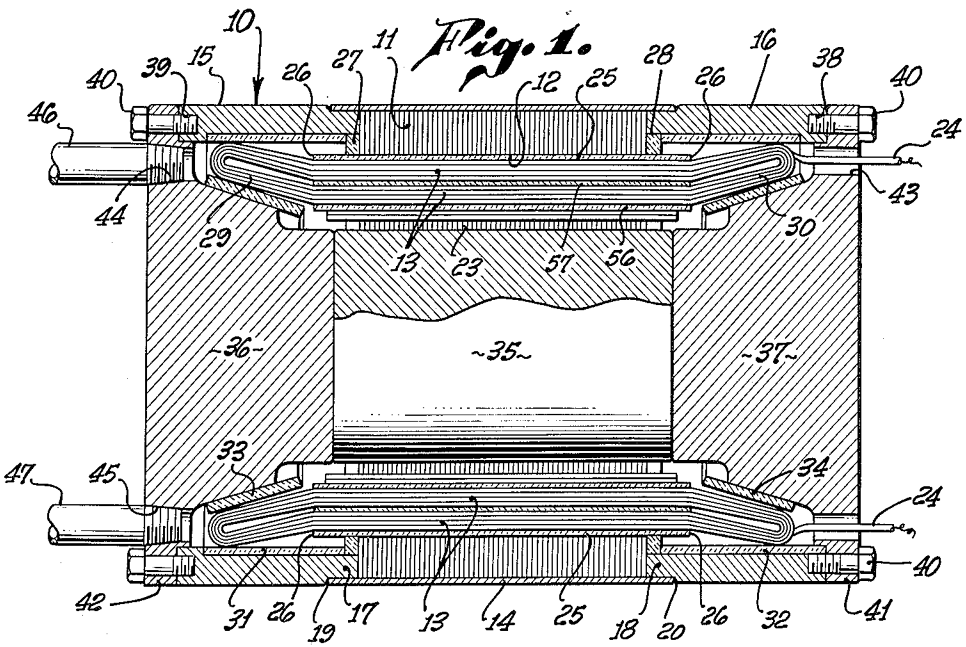
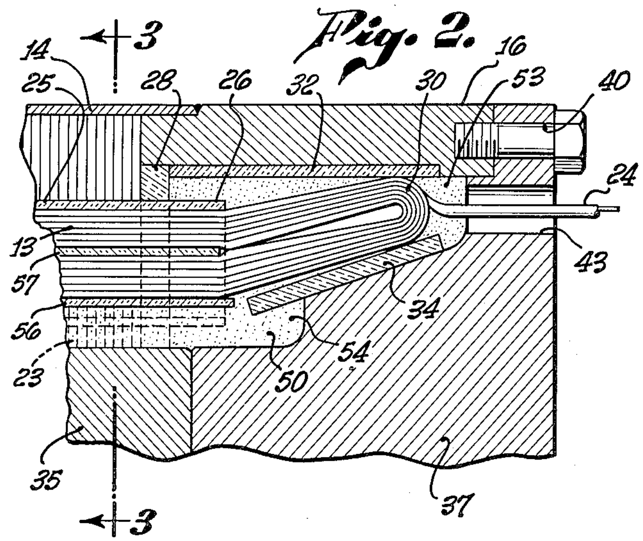
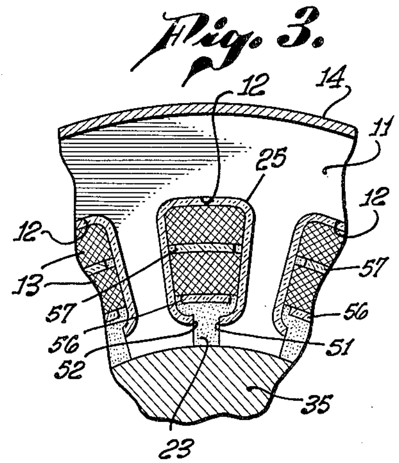
FREDERICK O. LUENBERGER, INVENTOR.
BY John Flam ATTORNEY.

United States Patent Office 2,749,456

Patented June 5, 1956

2,749,456

WATERPROOF STATOR CONSTRUCTION FOR SUBMERSIBLE DYNAMO-ELECTRIC MACHINE

Frederick O. Lueberger, Los Angeles, Calif., assignor to U. S. Electrical Motors, Inc., Los Angeles, Calif., a corporation of California Application June 23, 1952, Serial No. 295,020

11 Claims. (Cl. 310—43)

The present invention relates to submersible structures, and particularly to a motor structure in which the windings are completely isolated by surrounding them in a water impregnable layer of insulation material, and to methods of construction thereof.

It is an object of this invention to provide a submersible motor structure wherein the liquid in which the motor is submerged can directly surround the motor without danger of contamination of the windings with the liquid, or of short-circuiting any portion of the windings through partial or total breakdown of the insulation.

It is another object of this invention to provide a submersible motor structure that obviates elaborate compartmentalization of the motor and also obviates expensive sealing constructions for a motor housing.

It is another object of this invention to provide a dynamo-electric machine in which the windings thereof are enveloped by and separated by a sturdy insulation material that effectively maintains proper operating conditions for the device, preventing entrance of liquid in which the structure is immersed.

It is another object of this invention to provide a structure of this character in which the insulating plastic envelope can easily be formed by an injection process.

It is still another object of this invention to provide a structure of this character that is of sturdy construction.

It is yet another object of this invention to provide a structure of this character that effectively utilizes non-plasticized materials for properly positioning the windings away from the stator housing and the laminations, and yet that may later be integrated by fusion upon the addition of other plastic material, without bringing such non-plasticized material to its plastic state.

This invention possesses many other advantages, and has other objects which may be made more clearly apparent from a consideration of one embodiment of the invention. For this purpose, there is shown a form in the drawings accompanying and forming part of the present specification. The form will now be described in detail, illustrating the general principles of the invention; but it is to be understood that this detailed description is not to be taken in a limiting sense, since the scope of this invention is best defined by the appended claims.

Referring to the drawings:

Figure 1 is a longitudinal sectional view of a stator with elements that form a mold, the stator being ready for the molding process;

Fig. 2 is an enlarged sectional view showing the end of the stator slots and the end turns of the windings with the injection of plastic material completed, but before the mold core and end mold plates are removed; and Fig. 3 is a sectional view taken along the plane indicated by line 3—3 of Fig. 2.

In Fig. 1 a stator construction 10 is illustrated having laminations 11 and a plurality of arcuately arranged elongate slots 12 for accommodating the windings 13. A cylindrical central housing 14 of sheet metal or the like circumscribes the laminations 11. Auxiliary cylindrical housing members 15 and 16 telescope within the central housing 14. Reduced portions 17 and 18 of the members 15 and 16 form shoulders 19 and 20 abutting the ends of the cylindrical housing member 14. The members 15 and 16 form a continuation of the central housing 14. The members 14, 15, and 16 may be secured together in an appropriate manner, such as by welding. Any other conventional form of housing or frame construction could be provided for the stator laminations 11 and windings 13.

The slots 12 in this instance are recessed from the inner annular edges 22 of the laminations for substantial enclosure by the stator laminations 11. Each of the slots 12 is narrowed, as at 23, where it communicates with the interior of the stator. Other forms of slots could be provided, however, as the particular configuration forms no part of the present invention.

If the motor construction is immersed in a fluid, such as water, special precautions must be made in order to maintain proper insulation and to insure that the windings 13 will not become short-circuited, and also to insure that they will not become grounded to the stator laminations 11 through water. The conductors forming the windings 13 are covered with an insulation layer or coating 24, which may be a suitable plastic. However, this insulation coating 24 is subject to considerable stress when the windings 13 are appropriately formed in the stator laminations 11, and is not sufficiently waterproof to provide a permanent high insulation value.

For this purpose, insulation envelope-forming means are provided for the windings, serving as part of the structure for preventing entrance of water and also isolating the windings 13 from the laminations 11 and the housing members 14, 15, and 16. Each slot 12 is thus provided with a liner 25, shown most clearly in Fig. 3. This liner 25 conforms to the configuration of the slots 12, but terminates at the passageway 23.

It is intended that the envelope surrounding the windings 13 be later completely filled by a plastic material 50. The plastic material also enters into the spaces between the separate conductors of the windings 13. This material 50 will substantially rigidly integrate the windings 13 with the envelope and provide insulation between the separate turns of the windings 13, supplementing and restoring the insulation properties of the coating 24.

The slot liners 25 must be sufficiently rigid to permit them easily to be inserted in the slots 12. They must, furthermore, have insulation properties for preventing conduction from the separate windings 13 to the laminations 11 or the housing members 14, 15, 16. The liners 25 may thus be formed of a polyvinyl chloride that is non-plasticized, such that it has sufficient rigidity for ready insertion into the slots 12.

The liners 25 have ends 26 that extend beyond the laminations 11, forming a convenient place for attachment to other members forming an outer envelope for the windings 13, the ends 26 also providing a substantial area for promoting an effective seal for preventing entrance of water within the liners 25. Thus, end punchings 27 and 28 of plastic material telescope over the ends 26 of the slot liners 25 and abut the end laminations 11 of the stator 10 respectively. The end punchings 27 and 28 have apertures corresponding to the periphery of the slot liners 25. Annular plastic members 31 and 32 form continuations of the end punchings 27 and 28. These members are substantially cylindrical and are accommodated within the housing members 15 and 16 respectively. The ends of these members 31 and 32 abut the end punchings 27 and 28 at the outermost periphery of the latter. These cylinders are adapted to extend beyond the end turns 29 and 30 of the windings 13, and serve as a backing therefor.

The slot liners 25, although sufficiently rigid to permit easy insertion into the slots 12, must yet be sufficiently flexible, especially at their ends 26 to resist cracking upon the exertion of pressure by the end turns 29 and 30. Such material is chosen so as to be capable of being extruded into a precise shape for conforming to the configuration of the slots 12. Specific forms of non-plasticized polyvinyl chloride that are useful for this purpose are known; for example, the plastic commercially designated as "Geon 404."

The material forming the end punchings 27 and 28 and the cylinders 31 and 32 must be sufficiently rigid for defining the envelope for the windings. They are not subject to cracking by pressure of the end turns 29 and 30 as are the ends 26 of the slot liners, since the end punchings 27 and 28 and cylinders 31 and 32 are rigidly backed by the end laminations 11 and the housing-forming members 14 and 15 respectively. The end punchings 27 and 28 can be conveniently formed by a simple punching operation. The end punchings 27 and 28 and the cylinders 31 and 32 may also be made of a form of non-plasticized polyvinyl chloride, that is somewhat more rigid than "Geon 404"; for example, the plastic known commercially as "Lucoflex."

Since the conductors and the coating 24 forming the windings 13 are arranged in their closest arrangement, and being of small diameter, the spaces are small. Accordingly, the plastic material 50, intended to be inserted into and around the windings 13, must be in a highly fluid state when so inserted. It may thereafter gell or solidify, such as by raising the temperature of the plastic material. Such a thermo-setting material is an elastomer such as a plastisol of polyvinyl chloride or vinyl chloride plastigel. This injected plastic material 50 must be capable of gelling and bonding with the non-plasticized slot liners 25 and other members forming the envelope at a low enough temperature to prevent loss of rigidity of the envelope-forming members and the coating 24 of the conductor windings. Otherwise, the envelope-forming members and the coating 24 might be penetrated by the windings 13. This would produce a lessening of the effectiveness of the insulation, or even permit direct conduction to the laminations 11 and the housing members 14, 15, and 16 or between the conductors of the windings 13.

It has been found that sufficient water-tight bond between the injected plastic 50 and the non-plasticized envelope members can be achieved at a temperature of the order of 200° F. by first treating the envelope members with a bonding agent such as cyclohexanone or a solution of cyclohexanone and petroleum naphtha in substantially equal parts. A temperature of 200° F. is sufficiently low to prevent substantial loss of rigidity in the envelope members.

Since the slot liners 25 are of different material than the end punchings 27 and 28 and the end cylinders 31 and 32, it has been found that they need not be treated by the cyclohexanone to the same extent. Such treatment, in addition to conditioning the members for bonding, also produces a softening of the members. It has been found that the proper characteristics can be achieved by the following process:

The end punchings 27 and 28 and the cylinders 31 and 32 are positioned within the stator and then treated with cyclohexanone at a temperature of 150° F. The slot liners 25 are then inserted into the slots 12. The slot liners 25 and the already treated end punchings 27 and 28 and cylinders 31 and 32 are then treated with a solution of cyclohexanone and petroleum naphtha in equal parts for about ten minutes. The solution is then removed, and the envelope-forming members air dried. Thus, the end punchings 27 and 28 and the end cylinders 31 and 32 are twice subject to surface conditioning and thus treated to an extent greater than the slot liners 25.

An alternate method could be used, in which the end plates 27 and 28 and the cylinders 31 and 32 are treated before insertion. It is preferred, however, that the end plates 27 and 28 and cylinders 31 and 32 be treated after insertion, thereby minimizing damage to the surface by handling.

The windings 21 may then be formed through the slots 12 with the liners 25 in place. Elongate separators 56 and top sticks 57 are inserted during the winding operation for assisting in maintaining spaced relationships between some of the turns and at the passageway 23 to properly locate the innermost turns with respect to the inner periphery 22 of the laminations 11. The separators 56 and top sticks 57 are of a non-plasticized polyvinyl chloride that may be pre-treated with a bonding conditioner.

Conical members 33 and 34 of Lucoflex material extend within the end turns of the windings 21, and cooperate with the cylinders 31 and 32 to circumscribe the end turns 29 and 30. The conical members 33 and 34 converge inwardly of the stator construction to conform to the configuration of the windings 21. They terminate at their inwardmost ends short of the slot liner 26. The conical members are pre-treated with the cyclohexanone conditioner.

A core 35 is then accommodated within the stator laminations, and end mold plates 36 and 37 appropriately supporting the conical members 33 and 34 are then inserted from opposite ends of the stator construction. These end plates 36 and 37 may be secured by fastening them to the housing. For example, they are substituted for the motor end bearing brackets. Thus, the housing members 15 and 16 have threaded apertures 38 and 39 receiving bolts 40 passing through apertures in flanges 41 and 42 of the end plates respectively. One of the end plates 37 is provided with a plurality of apertures 43, a few of which permit passage of the conductors for suitable power connections to the stator when in use. The coating 24 is treated with a surface conditioner to insure bonding which is especially important where the conductors enter the stator.

The core 35 and end plates 37 and 38 complete the envelope partially formed by the slot liners 25, end plates 27 and 28, and annular members 31, 32, 33, and 34. As illustrated in Fig. 3, the end punchings are spaced substantially from the ends of the cylinders and conical members, insuring an ample end enclosure for the windings. The end plate 37 has diametrically opposite threaded apertures 44 and 45 communicating with the end space. Appropriate pipes or conduits 46 and 47 are accommodated in these apertures 44 and 45 respectively. The conduit 46 may form an inlet for the plastic material 50, and the conduit 47 may be connected to a source of vacuum, to subject the interior of the stator to a pressure less than atmospheric pressure in order to facilitate the injection process.

Before the plastic 50 is injected, the stator construction, with the core 35 and end plates 36 and 37 in place, is pre-heated to a temperature of about 220° F. This pre-heating brings about an optimum bonding efficiency between the envelope-forming members 25, 27, 28, 31, 32, 33, and 34, without impairing the effectiveness of the envelope-forming members. The elastomer material 50 is then injected at a pressure of the order of 70 p. s. i. through the inlet conduit 46 for completely filling the space surrounding the windings 13. A slight amount of the plastic material 50 may seep out of the apertures 43 of the end plate 37.

As illustrated in Figs. 3 and 4, the plastic material extends into the spaces between the separate conductors forming the windings 21. The separators 56 and 57, as illustrated clearly in Fig. 3, terminate laterally substantially short of the slot liners 25 in order to permit a substantial thickness of the plastic material 50 to be placed between them. The plastic 50 fills the passageway 23 forming the entrance to the slots 12, and bonds with the edges 51 and 52 of the slot liners 25.

As illustrated in Fig. 2, the plastic material contacts the outer periphery of the ends 26 of the slot liners 25 and the outer portion of the end plate 28 and the inner surface of the cylindrical member 32.

The conical member 34 terminates substantially short of the lowermost portion of the end 26 of the slot liner, and converges at a greater rate than the end turns 29 and 30. Accordingly, a substantial thickness of plastic 50 can bond respectively with opposed edges of slot liner 25 and the conical member 34, and extend for a substantial distance on both sides of the conical members 33 and 34. The plastic material, furthermore, extends beyond and encases the end turns of the windings 21 at 53, also reentering the conical member 34 at the end thereof. The plastic material 50 also bonds with the outwardmost portion of the cylindrical member 32. An effective sealing and insulation structure is thereby provided.

After the injection process is completed, the stator construction 10, with the core 35 and end plates 36 and 37, may be cured at a reduced but yet elevated temperature. After the plastic material 50 has gelated, the core 35 and end plates 36 and 37 are removed, and the rotor construction and bearings are assembled.

It has been found that such a stator may be continuously submerged in water, yet retaining a sufficient insulation resistance permitting safe use of the stator construction under water.

The inventor claims:

1. In a submersible structure: an annular core member having a plurality of slots extending longitudinally therethrough; a housing for the core member and extending beyond the ends of the core member; plastic liners for the slots respectively and having ends extending beyond the longitudinal ends of the slots; plastic elements for each end of the core member and having apertures through which the ends of the liners extend; a pair of outer plastic envelope forming members received in the housing at opposite ends and respectively contiguous with said elements at a place spaced from the apertures of the elements; a pair of inner envelope forming members for the ends of said windings respectively, and forming with said outer envelope forming members, end opening annular spaces aligned with the slots; windings in the liners for said slots, said windings having an insulation coating, the ends of said windings terminating within said annular spaces and combined by said inner and outer envelope forming members; and a plastic material encasing said windings and extending in said liners and filling said annular spaces.

2. In a submersible structure: an annular core member having a plurality of slots; plastic means lining said slots; annular plastic envelope forming members defining annular spaces at the ends of the core respectively; said annular spaces at their inner ends communicating with said slots; said annular spaces opening at their outer ends; windings in the liners of the slots, said windings having end turns accommodated in said annular spaces respectively and confined by said envelope forming members; and a plastic material in said annular spaces and said liners, said material being bonded to said liner and said envelope forming members.

3. The process of providing electrical insulation for the windings of a dynamo-electric machine having a core and a plurality of slots extending through the core: inserting plastic slot liners in the slots; the liners having ends extending beyond the ends of the slots; telescoping plastic elements over the ends of the liners; providing windings in the liners; confining the open ends of the windings in end opening annular envelopes formed respectively by inner and outer plastic envelope members; and injecting a plastic in a highly fluent state into the end opening of one of the envelopes for filling the liners and both envelopes.

4. The process of providing electrical insulation for the windings of a dynamo-electric machine having a core and a plurality of slots extending through the core: inserting plastic slot liners in the slots; the liners having ends extending beyond the ends of the slots; telescoping plastic elements over the ends of the liners; providing windings in the liners; forming annular end opening plastic envelopes for the opposite ends of the turns of the windings; treating the liners, elements, and envelope forming members with a bonding conditioner; and injecting a plastic in a highly fluent state into the end opening of one of the envelopes for filling the envelopes and the liners.

5. In a submersible structure: an annular core member having a plurality of angularly spaced slots extending longitudinally therethrough; a housing for the core and extending beyond the ends of the core member; plastic liners for the slots respectively and extending beyond the longitudinal ends of the slots; plastic elements for each end of the core member and having apertures through which the ends of the liners extend; a pair of outer plastic envelope forming members received in the housing at opposite ends and respectively contiguous with said elements at a place spaced from the apertures of the elements; windings in the liners for said slots, said windings having an insulation coating, the ends of said windings terminating within said outer envelopes forming members; a pair of inner envelope forming members accommodated within the ends of said windings respectively; said ends of said windings being confined by said inner and outer envelope forming members; said inner envelope forming members having one end respectively spaced from the ends of said slot liners as well as from said elements, the other end of said inner envelope forming members extending beyond said ends of said windings; and a plastic material encasing said windings and extending in said liners, and between the envelope forming members.

6. In a submersible structure: an annular core member having a plurality of angularly arranged slots extending longitudinally therethrough; a housing for the core member and extending beyond the ends of the core member; plastic liners for the slots respectively and extending beyond the longitudinal ends of the slots; plastic elements for each end of the core member and having apertures through which the ends of the liners extend; a pair of outer plastic envelope forming members received in the housing at opposite ends and respectively contiguous with said elements at a place spaced from the apertures of the elements; windings in the liners for said slots, said windings having an insulation coating, the ends of said windings terminating within said outer envelope forming members; a pair of inner envelope forming members accommodated within the ends of said windings respectively said ends of said windings being confined by said inner and outer envelope forming members; said inner envelope forming members having one end respectively spaced from the ends of said slot liners as well as from said elements, the other end of said inner envelope forming members extending beyond said end turns; said inner envelope forming members contacting said ends of said windings only at a limited area intermediate the length of said inner envelope forming members; and a plastic material encasing said windings and extending in said liners, and between the envelope forming members.

7. The method of insulating the windings of a dynamo-electric machine having a slotted magnetic structure: inserting layers of conductors in the slotted magnetic structure; inserting separators of non-plasticized polyvinyl chloride material between at least some of the layers of conductors; inserting non-plasticized polyvinyl chloride liners around the conductors to separate them from the magnetic structure; placing the magnetic structure in a mold forming enclosure; heating the assembled core and magnetic structure to a temperature insufficient materially to soften the non-plasticized polyvinyl chloride material; and injecting in the mold a plastigel material that has a low viscosity at said temperature, said plastigel at said temperature being capable of gelling and bonding with said liners and said separators.

8. The process of providing electrical water impregnable insulation for the windings for an annular slotted core member of a dynamo-electric machine having a housing: placing apertured semi-rigid plastic end members over the ends of the core member with the apertures thereof in registry with the slots of the core member; telescoping semi-rigid plastic cylindrical outer envelope forming members in the housing with their inner ends abutting the peripheral portions of the end members, inserting semi-rigid plastic slot liners in the slots of the core member; providing windings in the slots; placing semi-rigid plastic inner envelope forming members within the ends of the windings beyond the slots; elevating the temperature of the core member; and injecting a plastisol between the envelope forming members at a temperature sufficiently high to provide low viscosity of said plastisol and bonding with said slot liners, end members, and envelope members, but sufficiently low to prevent substantial loss of rigidity of said slot liners, end members, and envelope members, substantially completely filling the slot liners, and the spaces between the inner and outer envelope forming members.

9. The process of providing electrical water impregnable insulation for the windings for an annular slotted core member of a dynamo-electric machine having a housing: placing apertured semi-rigid plastic end members over the ends of the core member with the apertures thereof in registry with the slots of the core member; telescoping semi-rigid plastic cylindrical outer envelope forming members in the housing with their inner ends abutting the peripheral portions of the end members; treating the outer envelope forming members and the end members with a bonding conditioner while in place; inserting semi-rigid plastic slot liners in the slots of the core member; treating the envelope forming members, end members, and liners with a bonding conditioner while in place; providing windings in the slots; placing pre-treated semi-rigid plastic inner envelope forming members within the ends of the windings beyond the slots; elevating the temperature of the core member; and injecting a plastisol between the envelope forming members at a temperature sufficiently high to provide low viscosity of said plastisol and bonding with said slot liners, end members, and envelope members, but sufficiently low to prevent substantial loss of rigidity of said slot liners, end members, and envelope members, substantially completely filling the slot liners, and the spaces between the inner and outer envelope forming members.

10. In a submersible structure: an annular core member having a plurality of angularly arranged slots extending longitudinally therethrough; plastic liners for the slots; windings in the liners; elongate plastic strips over the windings in the slots, and having their opposite lateral edges spaced from the corresponding liners; and a plastic material substantially completely filling the slot liners and embedding said strips.

11. In a submersible structure: an annular core member having a plurality of angularly arranged slots extending longitudinally therethrough; plastic liners for the slots; windings in the liners; elongate plastic separators between some of the windings; elongate plastic strips over the windings in the slots, the separators and strips having their opposite lateral edges spaced from the corresponding liners and a plastic material substantially completely filling the slot liners and embedding said strips.

References Cited in the file of this patent

UNITED STATES PATENTS

| | | |
|---|---|---|
| 1,675,419 | Myers | July 3, 1928 |
| 2,089,583 | Sigmund | Aug. 10, 1937 |
| 2,252,440 | Safford | Aug. 12, 1941 |
| 2,383,019 | Sigmund | Aug. 21, 1945 |
| 2,455,862 | Goldberg | Dec. 7, 1948 |
| 2,473,842 | Askey | June 21, 1949 |
| 2,483,066 | Sigmund | Sept. 27, 1949 |
| 2,570,786 | Flynn et al. | Oct. 9, 1951 |

FOREIGN PATENTS

| | | |
|---|---|---|
| 594,794 | Germany | Oct. 3, 1934 |
| 704,729 | Germany | Apr. 5, 1941 |